United States Patent
Lin et al.

(10) Patent No.: US 8,274,497 B2
(45) Date of Patent: Sep. 25, 2012

(54) DATA INPUT DEVICE WITH IMAGE TAKING

(75) Inventors: Chih-Hsiung Lin, Sindian (TW);
Yi-Ping Hung, Sijhih (TW)

(73) Assignee: Era Optoelectronics Inc., New Taipei (TW)

( * ) Notice: Subject to any disclaimer, the term of this patent is extended or adjusted under 35 U.S.C. 154(b) by 934 days.

(21) Appl. No.: 11/224,989

(22) Filed: Sep. 14, 2005

(65) Prior Publication Data
US 2006/0158435 A1    Jul. 20, 2006

(30) Foreign Application Priority Data

Jan. 17, 2005  (TW) ............................... 94101299 A (51) Int. Cl.
*G06F 3/041* (2006.01)
(52) U.S. Cl. ...................................................... 345/178
(58) Field of Classification Search .......... 345/156–184; 340/539.1, 693.3, 426.35; 178/2 R
See application file for complete search history.

(56) References Cited

U.S. PATENT DOCUMENTS

| | | | |
|---|---|---|---|
| 5,936,615 A | 8/1999 | Waters | 345/173 |
| 6,650,318 B1 | 11/2003 | Arnon | 345/168 |
| 6,864,912 B1 | 3/2005 | Mahaffey et al. | 348/61 |
| 7,215,327 B2 | 5/2007 | Liu et al. | 345/168 |
| 7,339,489 B2 * | 3/2008 | Arita et al. | 340/693.3 |
| 2001/0020933 A1 * | 9/2001 | Maggioni | 345/156 |
| 2002/0021287 A1 * | 2/2002 | Tomasi et al. | 345/168 |
| 2002/0130979 A1 | 9/2002 | Kitaguchi et al. | 348/744 |
| 2002/0171633 A1 * | 11/2002 | Brinjes | 345/168 |
| 2003/0122780 A1 * | 7/2003 | Hendriks et al. | 345/156 |
| 2003/0132921 A1 * | 7/2003 | Torunoglu et al. | 345/173 |
| 2004/0108990 A1 * | 6/2004 | Lieberman et al. | 345/156 |
| 2005/0012721 A1 * | 1/2005 | Fong et al. | 345/170 |
| 2005/0179538 A1 * | 8/2005 | Morita et al. | 340/539.1 |
| 2006/0145825 A1 * | 7/2006 | McCall | 340/426.35 |

FOREIGN PATENT DOCUMENTS

| | | |
|---|---|---|
| EP | 1 336 172 B1 | 6/2007 |
| WO | WO 02/50762 A1 | 6/2002 |

\* cited by examiner

*Primary Examiner* — Chanh Nguyen
*Assistant Examiner* — Sanghyuk Park (57) ABSTRACT

A data input device comprises a microprocessor electrically connected to a camera device, a mirror installed in front of a lens of the camera device to allow the camera device to take a reference image reflected by the mirror. When the microprocessor detects that the camera device takes that a user touches the reference image in at least one input zone of an image, it then generates a corresponding input signal according to that the camera device takes that the user touches input images in at least one input zone. The data input device according to the present invention can more accurately and quickly generate input signal corresponding to an input operation processed by the user and saves the production cost more.

14 Claims, 7 Drawing Sheets

DATA INPUT DEVICE WITH IMAGE TAKING

BACKGROUND OF THE INVENTION

1. Field of the Invention

The present invention relates to a data input device, and more particularly to an image touch control type input device, which can be served as a data input tool for a general portable electronic product, computer or an electronic product with an image output.

2. Description of Related Art

U.S. Pat. No. 6,650,318 entitled "Data input device" discloses optical images for a user to input data generated by a data input device. A sensor is used for sensing the operation state that a user touches at least one input zone in the optical image. A microprocessor electrically connected to the sensor to allow the operation that the user touches at least one input zone to be transferred to corresponding input signals.

The most important part of the input device is in that whether the sensor can accurately detect that a user is processing an input operation and whether the microprocessor can accurately and quickly generate output signals corresponding to the input operation of the user. If the input device cannot accurately detect the input operation processed by the user, a great deal of wrong input data will be generated; this will cause trouble for the user on inputting data. If the input device cannot accurately and quickly generate corresponding input data according to the input operation processed by the user, this will cause the input operation processed by the user to be very inconvenient. Besides, the production cost is a consideration factor on manufacturing the input device; the cheaper production cost can allow the input device to be survived in a competitive market.

SUMMARY OF THE INVENTION

For providing a data input device capable of more accurately and quickly generating input data corresponding to an input operation processed by a user and rather saving the production cost, the present invention is proposed.

The main object of the present invention is to provide a data input device, using a digital camera to take an image that an input zone is touched and identifying whether a user is processing an input action so as to increase the accuracy of input data.

Another object of the present invention is to provide a data input device, capable of further using a vibration sensor or microphone to detect voices emitted from an input zone when it is touched so as to increase the accuracy judging whether an data inputting action is processed.

Still another object of the present invention is to provide a data input device, which has a simpler structure and the production cost is saved because of this.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 1:
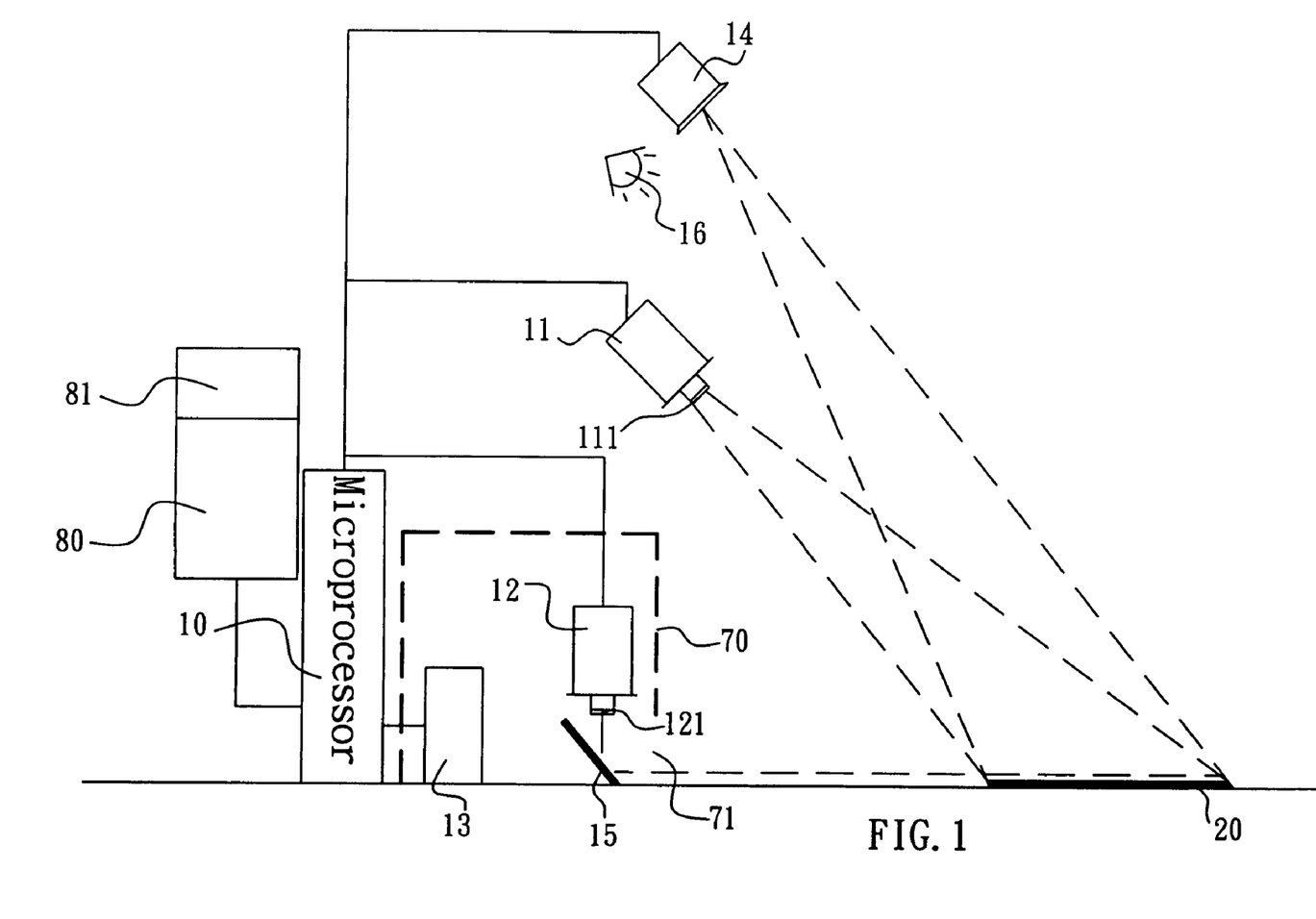
FIG. 1 is a schematic view, showing a data input device of a first preferred embodiment according to the present invention.

Please refer to FIG. 1. A data input device mainly comprises a microprocessor 10 electrically connected with a first digital camera 11, second digital camera 12 and vibration sensor 13, an image generating device 14 for projecting out a basic image 20 for a user to process an input operation, a mirror 15 located in front of a lens of the second digital camera 12 allowing the second digital camera 12 to take an image reflected from the mirror 15, and a light source 16 used for providing the illumination needed for the first digital camera 11 and the second digital camera 12 to take an image. The microprocessor 10 can also be electrically connected to an electronic product 80 in which a displayer 81 thereof is used to display the images taken by the cameras.

Figure 2A:
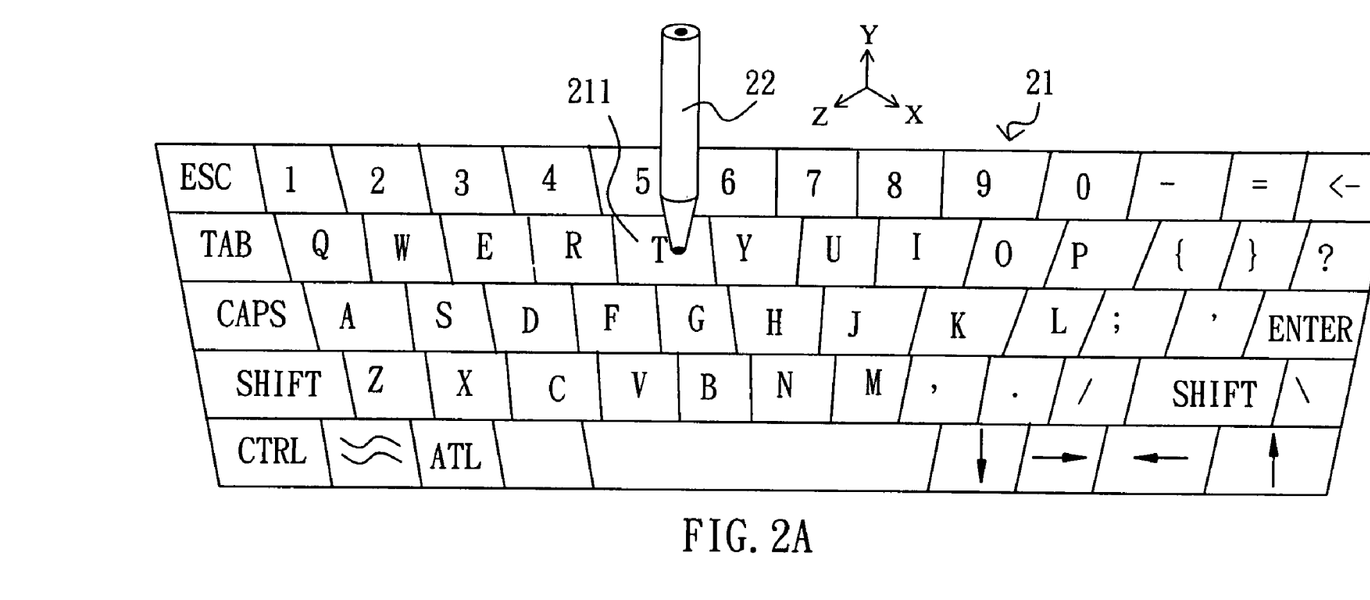
FIGS. 2A and 2B are schematic views, showing that images are taken by a first digital camera and a second digital camera according to the present invention.

The image generating device 14, such as the one disclosed in the U.S. patent mentioned above, can project out a keyboard image 21 shown in FIG. 2A on a projection face for a user to use an input pen 22 or a finger to touch at least one input zone 211 in the keyboard image 21 to process an data input operation, in which the projection face is on the xz plane of an operational coordinate system.

Figure 2B:
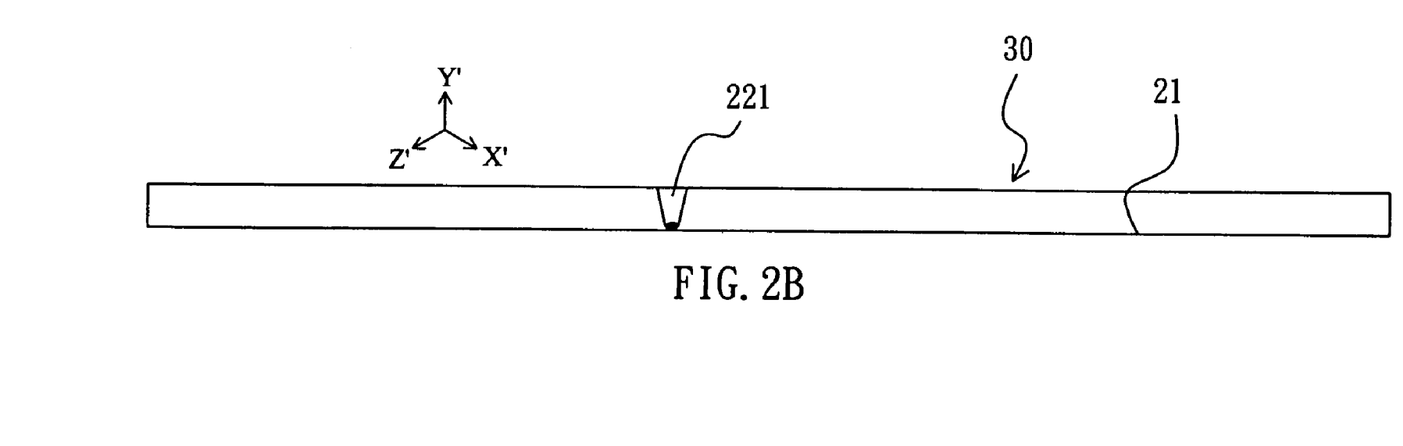

The relative positions of the second digital camera 12, the mirror 15 and the image 20 are adjusted to allow the level optical axis of the second digital camera 12 to be parallel to the projection face of the image 20, i.e. the x'z' plane of the reference coordinate system of the second digital camera 12 is parallel to the xz plane on which the projection face is located so as to allow the second digital camera 12 merely to be able to take a reference image 30 with an elevation of the reference image over the image 20 a preset short distance, e.g. a strip-shaped image shown in FIG. 2B. Because the second digital camera can only take a picture of an input pen image 221 in a range of short preset distance beyond the keyboard image 21, if the input pen 22 leaves the upper side of the keyboard image 21 and beyond the preset distance, the second digital camera 12 can then not take an image of the input pen 22, therefore, whether a user processes an input operation can be more accurately identified.

The design of the second digital camera 12 and the mirror 15 according to the present invention can be used to take the reference image of the input operation processed on the image 20 by means of a user's finger or the input pen 22 in order to identify whether the user is processing an input operation or not. If the microprocessor 10 detects that the second digital camera 12 takes the reference image that the user touches the image 20, the microprocessor 10 then generates a corresponding input signal depending on the input image taken by the first digital camera 11; the bottom of the image of the input pen 22 touches the input zone 211 of the keyboard image 21. For example, the microprocessor 10 relatively generates an input signal of "T" when the first digital camera 11 takes the input image that the input pen 22 touches the input zone 211 of "T".

The first digital camera 11 and the second digital camera 12 are combined into a camera device used to take a picture of the input image and the reference image of the input operation processed on the image 20 by means of the user's finger or the input pen 22.

The image of the input pen 22 taken by the second digital camera 12 of the present invention can provide the microprocessor 10 to identify the level position of the keyboard image 21 touched by the input pen 22, and the image of the input pen 22 is then taken by the first digital camera 11 to identify the vertical position of the keyboard image 21 touched by the input pen 22 such that which input zone 211 in the keyboard image 21 is touched by the input pen 22 can be quickly identified. Furthermore, corresponding information can be more quickly generated; the input information can then be quickly generated without needing a processor with a high speed operation function.

The vibration sensor 13 can be used to detect the vibration caused from the user's finger or the input pen touching the image. The user processing a data input operation can then be identified when the microprocessor 10 detects signals emitted from the vibration sensor 43; corresponding input signals are generated according to the images taken by the first digital camera 11 or the images taken by the first digital camera 11 and the second digital camera 12. The vibration sensor 13 is used to assist identifying whether the user touches the image and processing the input operation. Using a microphone to replace the vibration sensor can attain to a same function. The first digital camera 11 and the second digital camera 12 can be a CCD digital camera or CMOS digital camera.

The light source 16 with a specific illumination color can be used in the present invention to illuminate the user's finger or the input pen 22 when an input operation is being processed so as to allow the images of the finger or the input pen 22 taken by the first digital camera 11 and the second digital camera 12 to have a specific color and a better identification mark.

The first digital camera 11 and the second digital camera 12 are allowed to combine respectively with filtering masks 111 and 121 with a color same as the illumination color of the light source 16 so as to allow the taken image of the finger or the input pen 22 is not influenced by light pollution.

A lighter beam can be allowed to emit out from the image generating device 14 to replace the light source 16 and a brighter beam with a specific color can also be emitted from the image generating device 14.

The present invention can also allow the second digital camera 12, the vibration sensor 13 and the mirror 15 to be installed in a case 70. The case 70 has a hole 71 therein corresponding to the mirror 15, this can allow the mirror 15 to reflect an image that a user uses the image 20 to process an data input operation. Besides, the microprocessor 10, the second digital camera 12 and the vibration sensor 13 can be combined with a wireless transmission device, this can allow the wireless transmission device to be used for transmitting image signals and vibration signals to the microprocessor 10.

Figure 3A:
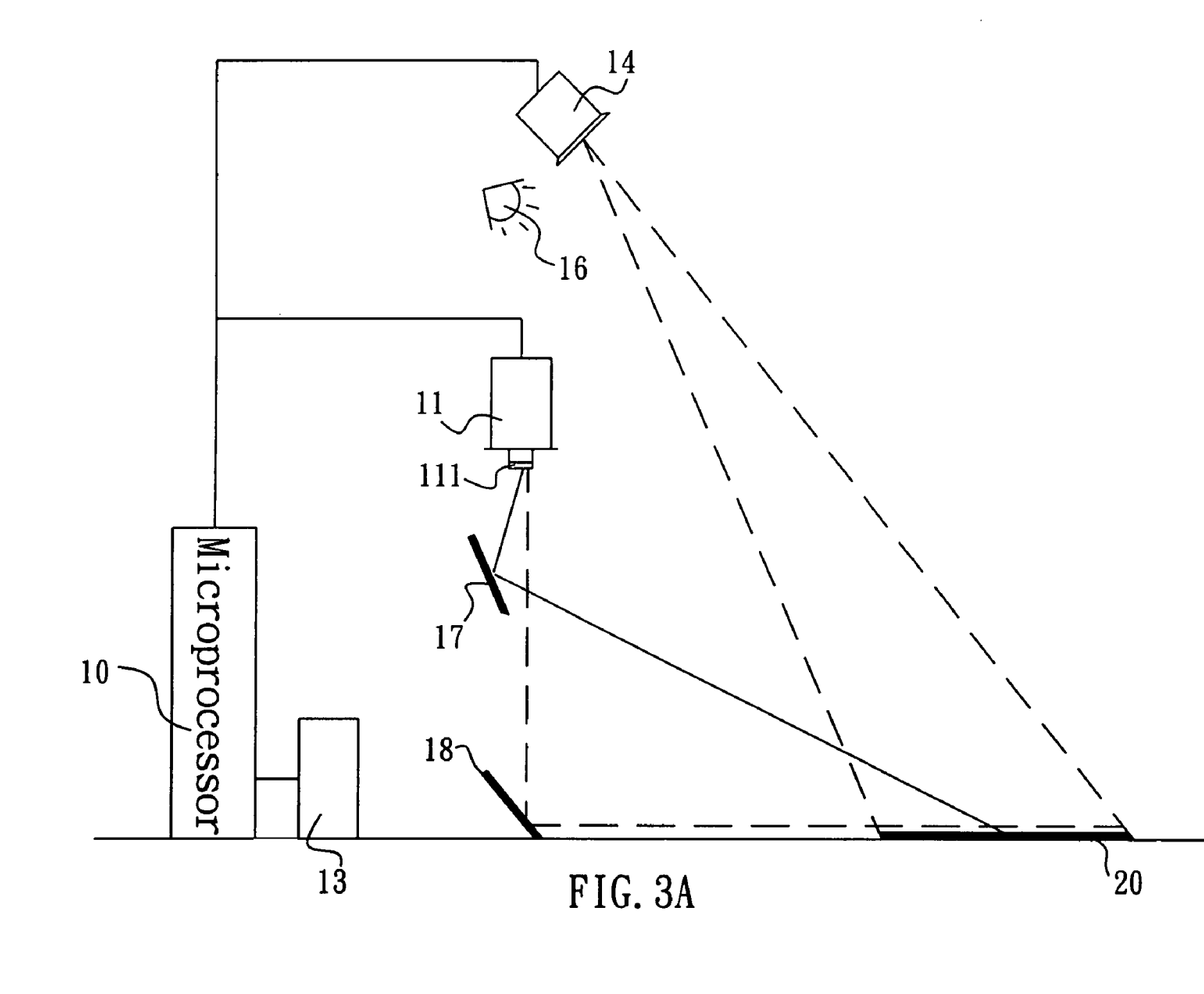
FIGS. 3A and 3B are schematic views, showing a data input device of a second preferred embodiment according to the present invention.
Figure 3B:
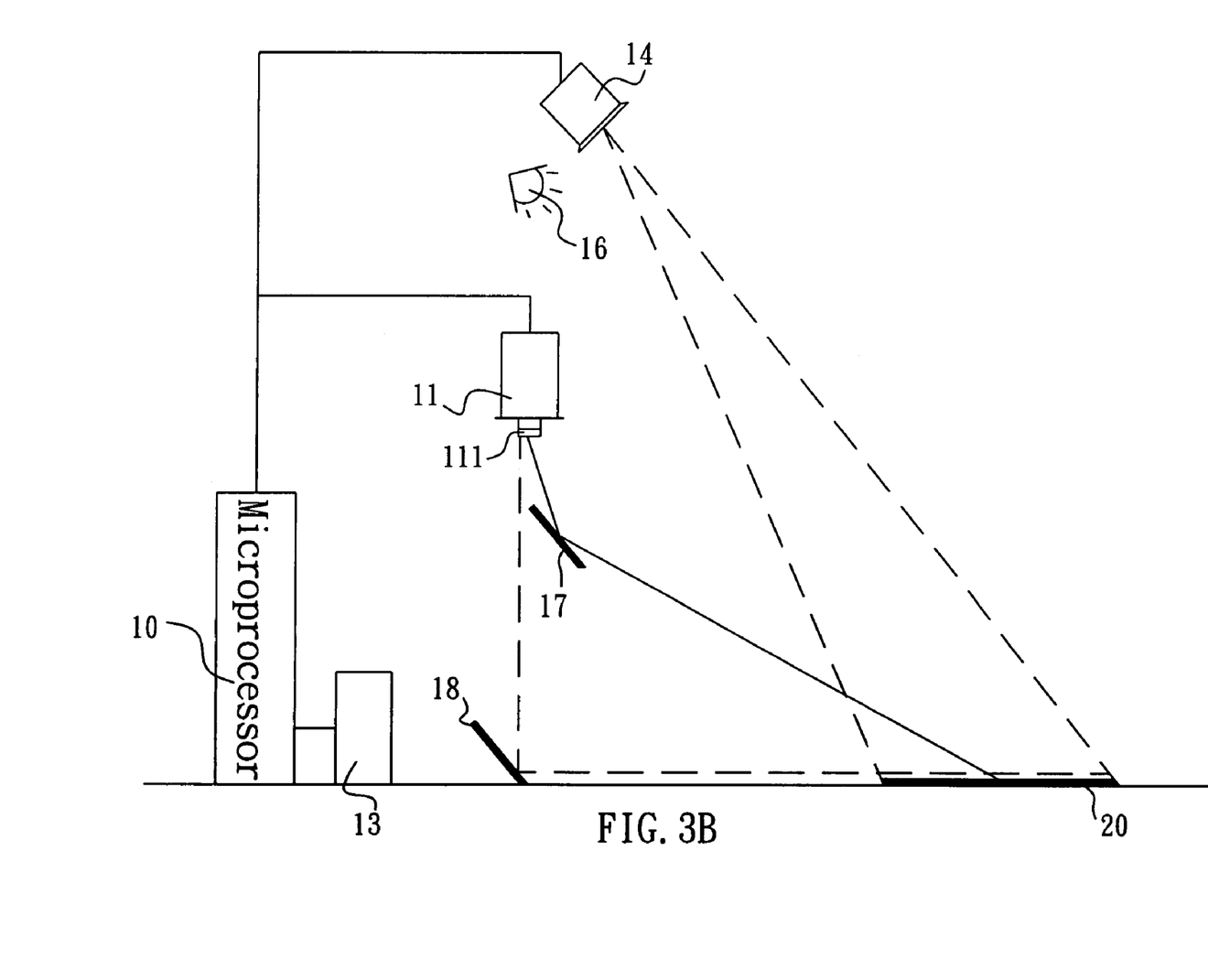

Please refer to FIGS. 3A and 3B. The figures show a data input device of a second preferred embodiment according to the present invention, in which the second digital camera 12 of the first preferred embodiment is omitted. Here, the first digital camera 11 has the functions of the second digital camera 12. But, a first mirror 17 and second mirror 18 must be installed in front of the lens of the first digital camera 11. Adjust the first mirror 17 and the second mirror 18 to proper positions, as FIGS. 3A and 3B show, the first digital camera 11 can then take the images reflected from the first mirror 17 and the second mirror 18 simultaneously, such as the keyboard image 21 and the reference image 30 shown in FIG. 2. Therefore, the structure of the data input device of the embodiment can be simplified.

Figure 4:
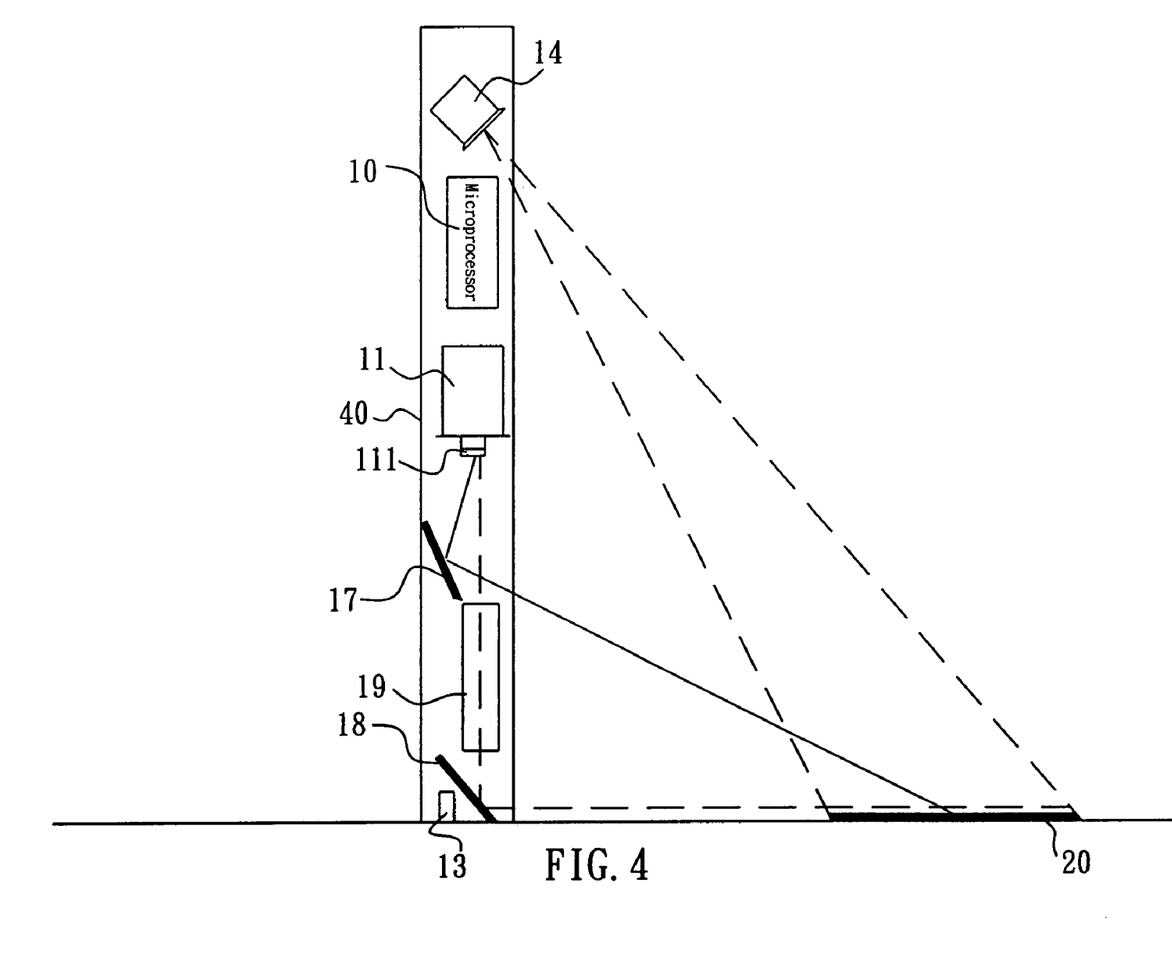
FIG. 4 is a schematic view, showing a data input device of a third preferred invention according to the present invention.

Please refer to FIG. 4. The figure shows a data input device of a third preferred embodiment according to the present invention, in which the microprocessor 10, the first digital camera 11, the vibration sensor 13 or the microphone, the image generating device 14, the first mirror 17, the second mirror 18 and a light director 19 are combined into a tubular container 40 for a convenient carrying. Holes are respectively disposed on the positions of the tubular container 40 corresponding to the vibration sensor 13 or the microphone, the image generating device 14, the first mirror 17 and the second mirror 18 for benefiting the transmissions of the vibration waves and the light. The light director 19 can be such as optical fibers or a lens set used for transmitting the image reflected from the second mirror 18 to the first digital camera 11.

Figure 5:
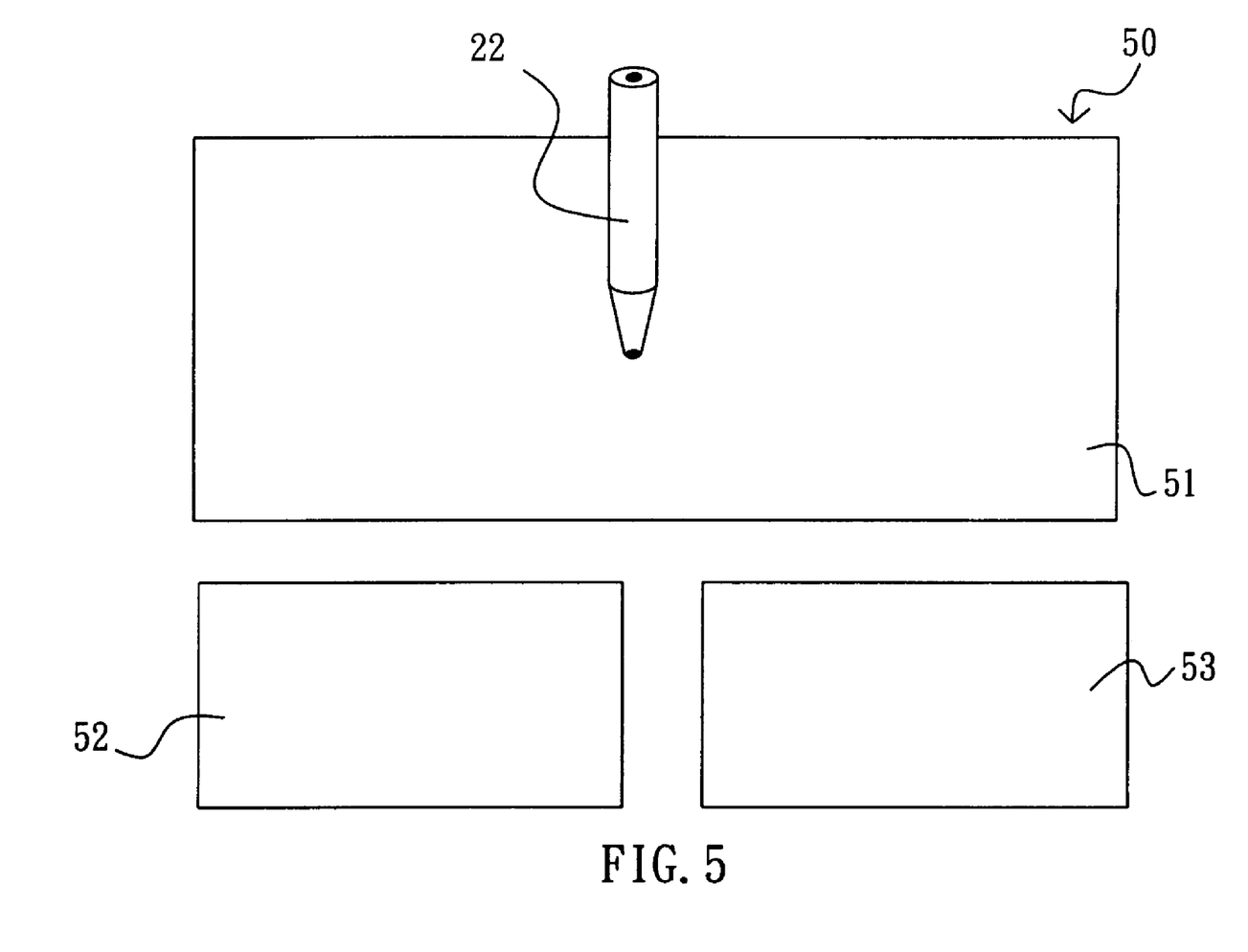
FIG. 5 is a schematic view, showing pictures for an input operation processed by a user according to the present invention.

Please refer to FIG. 5. A picture 50 can also directly be placed in front of the lens of the camera set to replace the image projected from the image generating device for a user to process an input operation. But, the picture 50 must be placed at a specific position capable allowable for a lens to take images. Images on the picture consists a plurality of input zones 51, 52 and 53 for a user to process an input operation on the picture 50 through his finger or the input pen 22. The input zone 51 is similar to a touch pad of a general notebook computer for a user to control a cursor on a display picture of a display of an electronic product electrically connected to the data input device according to the present invention like a mouse does, or process an input operation such as a handwriting input. The input zones 52 and 53 are similar to left and right and left buttons of the mouse; the microprocessor will then generate corresponding input signals when the user touches the input zones 52 and 53.

Figure 6:
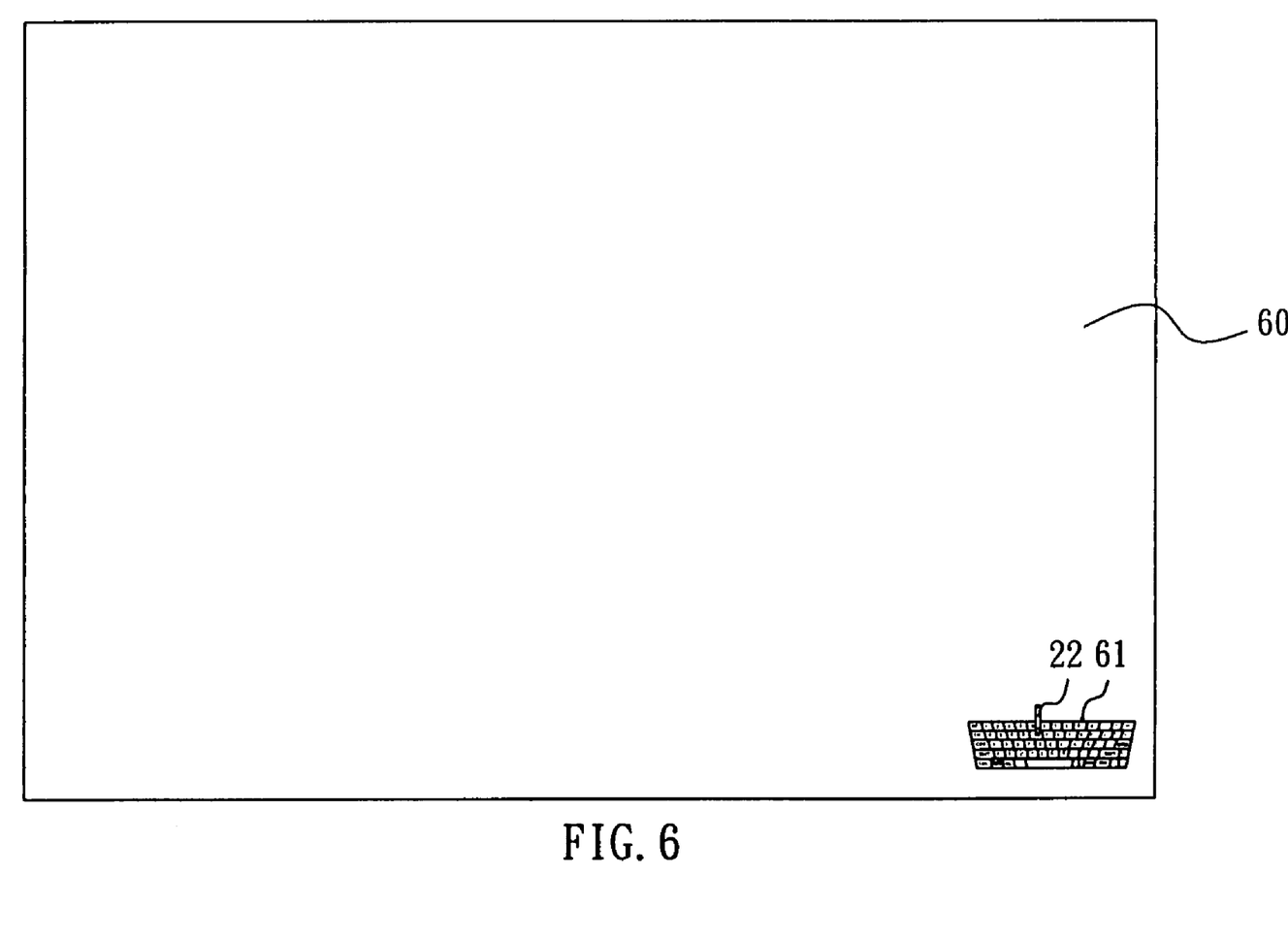
FIG. 6 is a schematic view, showing an image on a displayed picture for an input operation processed by a user according to the present invention.

Please refer to FIG. 6. An image such as a small keyboard image 61 in a picture 60 displayed on a displaying device of an electronic device to replace with the image for a user to process an input operation projected out through the image generating device mentioned above. The user uses a finger or the input pen 22 to process an input operation on a table in front of a lens of a camera device, an image processing the input operation on the keyboard 61 through the input pen 22 can be displayed in the displayed picture 60 after the image is taken through the camera device.

The data input device according to the present invention can generate input data corresponding to the input operation processed by a user more accurately and quickly and save the production cost more.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data input device comprising:
   a basic image, which is projected on a projection face of an xz plane of an operational coordinate system, having at least one input zone for being processed an input operation;
   a digital camera having a reference coordinate system with an x'z' plane parallel to said xz plane, and having a lens capable of taking an input image disposed on said input zone at the time of said input operation being processed and a reference image disposed on the same input zone corresponding to said xz plane respectively;

a microprocessor being electrically connected to said digital camera for detecting said input image and said reference image and generating an input signal corresponding to said input image if said detected reference image is an image showing said input zone being touched;

wherein a first mirror is installed in front of said lens to reflect said input image for said input image being taken by said digital camera, and a second mirror is installed in front of said lens to reflect said reference image onto an elevation within a preset short distance from said xz plane for said reference image being taken by said digital camera prior to said microprocessor is capable of detecting said reference image and generating said input signal;

the input image and the reference image are taken at two different angles; each light path between source of input image and reference image and the digital camera is produced by single reflection of the first mirror and second mirror respectively;

wherein, the first and second mirrors are disposed at two different locations to reflect light beams in different directions to the same digital camera via different directions.

2. The data input device according to claim 1, wherein said basic image is projected out from an image generating device.

3. The data input device according to claim 2, wherein said microprocessor is electrically connected to a microphone to sense if a voice generated from said basic image being at the time of said basic image being touched and identify said input operation is processed after the voice has been sensed.

4. The data input device according to claim 3, wherein said microprocessor, said digital camera, said image generating device, said microphone and said mirrors are arranged in a tubular container.

5. The data input device according to claim 2, wherein said microprocessor, said digital camera, said image generating device and said two mirrors are arranged in a tubular container.

6. The data input device according to claim 2, wherein a beam with a specific color is projected out from said image generating device.

7. The data input device according to claim 6, wherein the lens of said digital camera is combined with a light filtering mask, and said light filtering mask has the same color as the light projected out from said image generating device.

8. The data input device according to claim 2 further comprises a light source to provide a necessary light illumination when said digital camera takes said input image and said reference image.

9. The data input device according to claim 8, wherein a beam with a specific color is projected from said light source.

10. The data input device according to claim 9, wherein the lens of said digital camera is combined with a light filtering mask, and said light filtering mask has the same color as the light emanated from said light source.

11. The data input device according to claim 1, wherein said basic image is projected onto a picture with three input zones.

12. The data input device according to claim 1, wherein said basic image is projected onto a picture and shown by a displayer of an electronic product, which is connected to said microprocessor.

13. The data input device according to claim 1, wherein said microprocessor is electrically connected to a vibration sensor to detect if a vibration is generated from said basic image at the time of said basic image being touched and identify said input operation is processed after the vibration has been detected.

14. The data input device according to claim 13, wherein said microprocessor, said digital camera, said image generating device, said vibration sensor and said mirrors are arranged in a tubular container.

* * * * *